United States Patent
Lumelsky et al.

(10) Patent No.: US 6,460,082 B1
(45) Date of Patent: Oct. 1, 2002

(54) MANAGEMENT OF SERVICE-ORIENTED RESOURCES ACROSS HETEROGENEOUS MEDIA SERVERS USING HOMOGENOUS SERVICE UNITS AND SERVICE SIGNATURES TO CONFIGURE THE MEDIA SERVERS

(75) Inventors: Leon L. Lumelsky, Stamford, CT (US); Nelson R. Manohar, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,274

(22) Filed: Jun. 17, 1999

(51) Int. Cl.[7] .............................................. G06F 15/173
(52) U.S. Cl. ........................ 709/226; 709/223; 709/224; 709/225
(58) Field of Search ................................. 709/223, 224, 709/225, 226, 328

(56) References Cited

U.S. PATENT DOCUMENTS

| | | | |
|---|---|---|---|
| 5,442,791 A | * 8/1995 | Wrabetz et al. | 709/330 |
| 5,826,239 A | * 10/1998 | Du et al. | 705/8 |
| 5,999,525 A | * 12/1999 | Krishnaswamy et al. | 370/352 |
| 6,058,423 A | * 5/2000 | Factor | 709/226 |
| 6,085,030 A | * 7/2000 | Whitehead et al. | 709/203 |
| 6,175,878 B1 | * 1/2001 | Seaman et al. | 709/315 |
| 6,216,173 B1 | * 4/2001 | Jones et al. | 709/328 |

FOREIGN PATENT DOCUMENTS

| | | |
|---|---|---|
| EP | 0 674 280 A2 | 9/1995 |
| EP | 0 834 809 A2 | 4/1998 |
| EP | 0 848 334 A1 | 6/1998 |
| WO | WO 92/1420 | 8/1992 |
| WO | WO 93/20511 | 10/1993 |
| WO | WO 98/15903 | 4/1998 |
| WO | WO 99/44121 | 9/1999 |

\* cited by examiner

*Primary Examiner*—Zarni Maung
*Assistant Examiner*—Nabil El-Hady
(74) *Attorney, Agent, or Firm*—Scully, Scott, Murphy & Presser; Douglas W. Cameron

(57) ABSTRACT

A system and method for configuring service-oriented resources suitable for the resource management in a media server and more particularly, for resource configuration across distributed media servers. Heterogeneous media serves are configured in terms of homogeneous service-oriented resource units each used to represent a resource allocation commitment from a participating server for provisioning a particular media service on demand. A service unit associated with each different service supported by a media server represents an envelope of resource requirements as needed for provisioning a service. The method includes generating a resource envelope, and additionally compensating, at a media server, for differences between true resource utilization and resource envelope projected by a service unit. Each service unit also comprises a signature representing metadata used to control access to a service unit by defining rights, privileges, and characteristics of services that may use that particular server unit.

24 Claims, 8 Drawing Sheets

151

152

Resource Envelope

| Time | CPU | Mem | B/W |
|------|-----|-----|-----|
| T    | c   | b   | a   |
| T₁   | c   | e   | d   |

Note:
s1 is local storage bin,
s2 is global storage bin,
r1 (b1, c1, m1) is local service bin,
r2 (b2, c2, m2), and r3 (b3, c3, m3) are global service bins

MANAGEMENT OF SERVICE-ORIENTED RESOURCES ACROSS HETEROGENEOUS MEDIA SERVERS USING HOMOGENOUS SERVICE UNITS AND SERVICE SIGNATURES TO CONFIGURE THE MEDIA SERVERS

BACKGROUND OF THE INVENTION

1. Field of the Invention

The present invention relates generally to techniques for managing resources on distributed computer systems, and more particularly, to a system and method for managing resources for provisioning media services in future Internet utilities environments for the delivery of multimedia content.

2. Discussion of the Prior Art

The next generation of the Internet provides future applications with the opportunity to leverage resources across widely distributed resources via its ability to provide quality of service (QoS), large bandwidth connectivity (e.g., very-high-performance Backbone Network Service or vBNS), differentiated services (diff-serv), and unique addressing (e.g., IPv6). To applications, this blend of technologies introduces the notion of virtual proximity, i.e., the logical and apparent proximity of widely distributed resources to applications. For applications to make efficient use of these resources, mechanisms are needed to distribute the resulting uncoordinated application load presented by millions such applications to these resources. However, the task of resource management across widely distributed media servers across the Internet is not yet well understood and has been recognized as an emergent issue in the literature.

At the same time, an emerging set of computer utilities is foreseen. Some examples of these new service utilities are concepts such as Internet TV and radio, to name a few. The nature of a service utility is centered on the engineering of distribution channels. In traditional distribution channels such as the telephone network, control of the distribution is achieved via over-engineering and statistical multiplexing of resources. Until now, several reasons have discouraged over-engineering of resources over the Internet—those being primarily, medium properties at high load (e.g., burstiness and unpredictability) and, the lack of a central administration to enable the over-engineering of end-to-end resources. With the emergence of virtual proximity, a new paradigm is possible in which statistical over-engineering of end-to-end resources is now desirable.

The task of leveraging the increased availability of widely distributed content and resources becomes very important with the proliferation of the next generation of the Internet, e.g., Internet2. There are a number of publications and patents in the area of QoS-driven resource management. Most of the work has been focused on either the network, as described in U.S. Pat. No. 5,388,097 issued Feb. 7, 1995 to Baugher, M. J. et al., and entitled "System and Method for Bandwidth Reservation for Multimedia Traffic in Communication Networks," and U.S. Pat. No. 5,581,703 issued Dec. 3, 1996 to Baugher, M. J. et al, and entitled "Method and Apparatus for Reserving System Resources to assure Quality of Service"; or, the operating system, such as described in the reference "An Architecture Towards Efficient OS Support for Distributed Multimedia", Proceedings of IS&T/SPIE Multimedia Computing and Networking Conference '96, San Jose, Calif., January 1996 by David K. Y. Yau and Simon S. Lam. With the proliferation of multimedia services on Internet, it was soon realized that while IP networks were able to provide a simple, best-effort delivery service, the IP protocol is not suited for use with new real-time applications, such as multimedia streaming, Virtual Reality applications, distributed supercomputing. As a result, new network protocols, such as Resource Reservation Setup Protocol (RSVP) (See, e.g., "The Grid: Blueprint for a New Computing Infrastructure," Edited by Ian Foster and Carl Kesselman, Chapter 19, pp. 379–503, Morgan Kauffman Publishers, 1999); Real Time Transport Protocol (RTP); Real Time Transport Control Protocol (RTCP) and others, were developed (See, e.g., William Stallings, "High-Speed Networks: TCP/IP and ATM Design Principles", Prentice Hall, 1997; and, I. Busse, B. Deffner, and H. Schulzrinne, "Dynamic QoS Control of Multimedia Applications based on RTP", Computer Communications, January 1996), enabling applications to request and negotiate network QoS parameters, such as bandwidth and latency. Deployment of those protocols on the current Internet has not been successful, firstly because it required upgrading all the non-RSVP routers and servers system software. Secondly, even if RSVP were deployed on the current Internet, very limited bandwidth and computing resources would still have been the bottleneck for successful deployment of real-time applications. The current Internet was built on the backbone, enabling cross-country communications on relatively unclogged T3 (45 megabit per second). Proliferation of graphic pages, and streaming audio and video applications depleted those resources quite fast. Even worse, the rate of user's population growth is considerably higher than newly build network resources.

The National Science Foundation and MCI Corporation, responding to the emerging needs of Internet community has been building a new network, called the very-high-performance Backbone Network Service (vBNS). This nationwide network also provides a backbone for the two foundations, university-led effort called Internet 2 and by federal research agencies, called New Generation Internet.

The VBNS allows most of the connected institutions to run at 622 million bits per second (OC12). By the year 2000, vBNS is expected to operate at 2.4 gigabits per second (2,400 megabits per second) by the year 2000.

The vBNS system exploits RSVP protocol to support two distinct classes of services: a Reserved Bandwidth Service, i.e. a service with bandwidth commitment, and a traditional best-effort IP service (See, e.g., Chuck Song, Laura Cunningham and Rick Wilder, "Quality of Service Development in the vBNS", MCI Communications Corporation, provided at the URL http://www.vbns.net/presentations/papers/QoSDev/ieeeqos.htm. Still, resource management at the network layer for vBNS is done separately from operating system layer and in isolation from application needs and availability of the end-resources, such as storage and computing resources.

A new breed of high performance applications such as remote surgery, robotics, tele-instrumentation, automated crisis response, digital libraries of satellite data, distance learning via multimedia supported Web sites, enhanced audio, and video, is emerging. However, to accommodate such high performance applications and their continuous media flows, it is not enough to increase or reserve network capacity. These new applications require end-to-end resource reservation and admission control, followed by co-ordination of distributed functions such as: (a) resource scheduling (e.g., CPU, disk, etc.) at the end-system(s), (b) packet scheduling and flow control in the network, and (c) monitoring of the delivered end-to-end quality of service. It is essential that quality of service is configurable, predictable and maintainable system-wide, including the end-system devices, communications subsystem, and networks. Furthermore, all end-to-end elements of distributed systems architecture must work in unison to achieve the desired application level behavior.

Up do date, there has been considerable effort in the development of end-to-end quality of service support. Among them are Heidelberg QoS Model, developed within HeiProject at IBM's European Networking Center and described in the reference entitled "HeiRAT—Quality of Service Management for Distributed Multimedia Systems", Multimedia Systems Journal, 1996 by Volg, C., Wolf, L., Herrtwich, R. And H. Wittig; an Extended Integrated Reference Model (XRM), developed by COMET group at Columbia University such as described in the reference entitled "Building Open Programmable Multimedia Networks", Computer Communications Journal, Vol. 21, No. 8, pp. 758–770, June 1998 by Campbell, A. T., Lazar, A. A., Schulzinne, H. And R. Stadler; OMEGA end-point architecture, developed as the interdisciplinary research effort in the University of Pennsylvania such as described in the reference entitled "Design, Implementation and Experiences of the OMEGA End-Point Architecture", Technical Report (MS-CIS-95-22), University of Pennsylvania, May 1995 by Nahrstedt K. And J. Smith; in-serv Architecture which is a contribution of the Internet Engineering Task Force (IETF) such as described in the reference entitled "A Framework for End-to-End QoS Combining RSVP/Intserv and Differentiated Services," Internet Draft, IETF, March 1998 by Bernet Y, et al.; the Quality of Service Architecture QoS-A, developed by A. Campbell, and presenting an integrated framework dealing with end-to-end QoS requirements such as described in the reference entitled "A Quality of Service Architecture", PhD thesis, Lancaster University, January 1996 by Andrew T Campbell. Another reference which analyzes the above mentioned QoS paper is entitled "A Survey of QoS Architectures", ACM/Springer Verlag, Multimedia Systems Journal, Special Issue on QoS Architecture, Vol. 6, No. 3, pp. 138–151, May 1998 by Aurrecoechea, C., Campbell, A. T. and L. Hauw.

Substantial work has been done by SRI International, developing an End-to-End Resource Management of Distributed Systems (ERDoS), which enables adaptive, end-to-end, scalable resource management of distributed systems such as described in the reference ERDOS QoS Architecture, Technical Report, SRI International, May 1998. An extensible Resource Specification Language (RSL) and the resource management architecture has been implemented within Globus meta-computing toolkit, and used to implement a variety of different resource management strategies such as described in Czajkowski, K., et al., "A Resource Management Architecture for Metacomputing Systems" Proc. IPPS/SPDP '98 Workshop on Job Scheduling Strategies for Parallel Processing, 1998; and Foster, I., Kesselman, C., "The Globus Product: A Status Report" Proc. IPPS/SPDP '98 Heterogeneous Computing Workshop, pp. 4–18, 1998.

While the architectures described in the above-mentioned references are directed resource reservation and management of end-to-end resources, they generally assume a single, even geographically limited network subsystem which provides bounds on delay, errors and meet bandwidth demands, and an operating system which is capable of providing run time QoS guarantees. However, the next generation Internet must be viewed not as only a network of networks, but first and foremost a system of distributed systems. In this paradigm, not only the communication resources, but also the computing and storage servers are shared among many users.

Thus, the architectures mentioned above do not provide a coordinated management of overall system resources as a function of request activities for individual content and computing resources. It deals with resources pre-assigned to particular services. Consequently, quality of service must be degraded in response to growing volume of requests for such services over and above an established limit. As the above-mentioned architectures focus on providing QoS as requested by application, they do not take an advantage of a possible aggregation of resources due to commonality between user requests for a particular service.

For example, it would be desirable to determine commonality for the usage history of a particular multimedia content, e.g., bursts of requests within short time intervals, the proximity of origination addresses of requests, etc. In addition, the architectures described above do not allow for dynamic monitoring and recording of resource consumption for individual services as well as for groups of related services, with the purpose of calculating cost of service for individual clients.

Thus, it would be highly desirable to provide a resource management mechanism for widely distributed resources that leverages the strengths of the next generation of Internet, and further, a system that enables coordination of all system resources for dynamic polling, re-assignment and release of resources, consequently, to provide a QoS requested by an application.

Prior approaches to resource management had focused on the independent optimization of individual resources in an operating system -whether centralized or distributed. Later approaches have provided higher level models for independent resource management but lack the coordination of multiple resources. For example, although RSVP provides end-to-end resource reservation as required by multimedia applications, it lacks the notion of coordination and co-allocation across resources such as CPU or disk.

Thus, it would be highly desirable to provide a novel resource management system that moves away from single resource, single node resource management to multiple resource, multiple node resource management.

SUMMARY OF THE INVENTION

It is an object of the invention to provide a system and method for managing resources in a distributed network that supports a utilities model for media services and accounts for virtual proximity over the next generation Internet. In an Internet multimedia utilities model, media services are provisioned to a paying subscribers mass in a manner such that the location of the provisioning party is irrelevant to subscribing parties as long as guarantees are made and met.

It is a further object of the present invention to provide a mechanism for managing resources across heterogeneous servers that is capable of driving and fostering the Internet media utilities model, and particularly, a mechanism for administering, deploying, and configuring media servers in an Internet media utilities environment that permits leveraging virtual proximity over the resources provided by distributed media servers scattered throughout a network.

It is another object of the present invention to implement a novel approach to resource management by moving away from single resource, single node resource management to a multiple resource, multiple node resource management. This novel approach to resource management moves away from the optimization of single resource utilization to the statistical engineering of a set of resources. The present invention implements means to integrate resource management (i.e., typically low-level functionality) with high-level service management (i.e., application-level functionality).

The present invention relates to a service-oriented approach to multimedia resource management across distributed servers for the provisioning of Internet multimedia utilities to paying subscribers. Particularly, a system and method for the integrated management of services and resources across widely distributed media servers is provided. The system and method includes configuring heterogeneous media servers in terms of homogeneous service-oriented resource units referred to as "service units" which are used to represent a resource allocation commitment from a participating server to be able to provision a particular media service on-demand. In the preferred embodiment, the service unit is represented in terms of an allocation vector whose members represent resource allocations for memory, disk, network, and CPU resources. A service unit represents an envelope of resource requirements as needed for provisioning of a media service with the generated resource envelope representing a bound set according to some criteria over a set of critical resources required for the provisioning of a media service. Accordingly, a different service unit is associated with each service with the same service unit definition possibly resulting in different resource envelopes across different servers supporting the same media service. Such resource envelope profiles may be time-variant or constant. The system of the invention additionally provides a mechanism for generating and adapting such resource envelopes for any media service.

According to the invention, a server is referred to as a meta-resource ("a resource that provides resources") which refers to the service viewpoint and not the traditional reference to low-level resources such as memory, CPU, bandwidth, etc.. The ability (e.g., the necessary software) of any meta-resource to provision a media service is referred to as a capability with the notion of the service unit being the commitment to provision such service to a subscribing party.

It is also an object of the present invention to allow the meta-resource to remain autonomous. Thus, according to the principles of the invention, by providing application-level access control onto a meta-resource, the autonomy of meta-resources is preserved. To this end, each service unit is associated with metadata referred to as a "service signature" which is implemented to customize the service commitment of a meta-resource, e.g., by delivering hints to the meta-resource about resource management. For example, the service signature could be used to define access rights and characteristics for any particular service unit. Similarly, the service signature may recommend run-time compensation strategies to be used to update the resource envelope for this service unit under this meta-resource type at different loads. Thus, the service signature is one of the ways in which the present invention allows the integration of service management with resource management.

Advantageously, the present invention enables an arbitrary media server to participate and offer a position of value to an open and deregulated Internet utilities environment. To this end, the system of the present invention removes heterogeneity in resource management across heterogeneous servers. That is, according to the invention, the meta-resource may react to a remote administration authority or entity however, retain autonomous control of its resources. Thus, the invention permits the configuration of a meta-resource in terms of service units (i.e., service-oriented promises or commitments) to the authority while the fulfillment of these commitments is left to the meta-resource.

Furthermore, according to the invention, a meta-resource may be partitioned and administered as different and independent resource pools: a local resource pool implemented by the meta-resource to provide media services under local administration; and, a global resource pool implemented by the meta-resource to provide media services under remote administration.

Administration of these resource pools is enabled in terms of the type and number of service units, thus enabling the administrator of the meta-resource to enhance the value such meta-resource offers to the remote administration. Such administration may be based on some criteria such as the expected revenue, or some other cost metric. This results in individual meta-resources being entitled to various degrees of greediness toward acquisition of service requests by administration of their resource pools and their selection of service units and service capabilities.

The present invention is used to address the domain of Internet utilities and its application to multimedia services in a novel and useful manner. As an emerging set of Internet utilities is foreseen including Internet TV and Internet radio, to name a few, with applications ranging from distance learning, virtual reality, entertainment services, etc., the nature of a service utility is centered on the engineering of distribution channels. In traditional distribution channels such as the telephone network, control of the distribution is achieved via over-engineering and statistical multiplexing of resources. With the emergence of virtual proximity, the present invention makes possible and desirable the statistical over-engineering of end-to-end resources while providing a new revenue participation model for meta-resources while fostering the proliferation of meta-resources.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
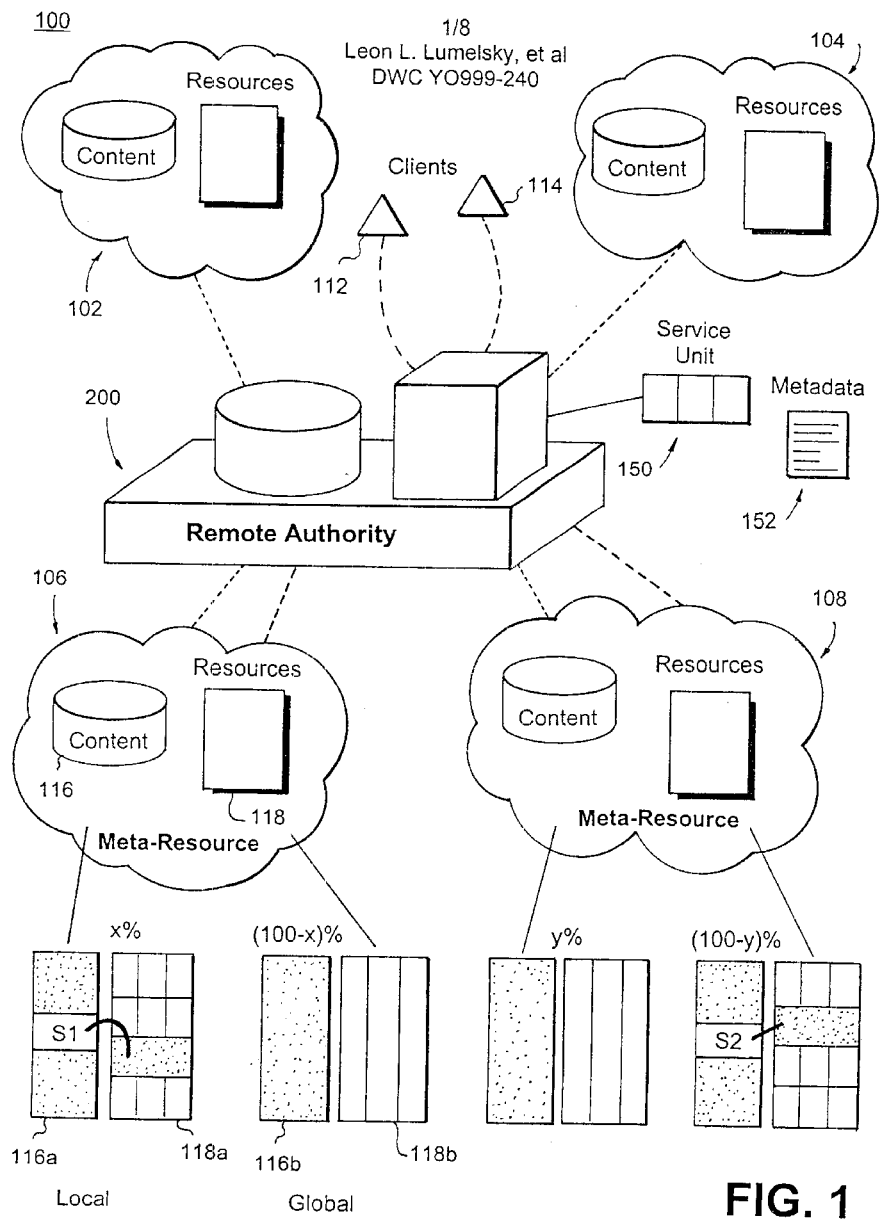
FIG. 1 is an illustration depicting an Internet media utilities environment.

FIG. 1 depicts an Internet media utilities environment model or global meta-system 100 where media services are provisioned to a paying subscribers mass. According to the invention, as will be described hereinafter in greater detail, the location of the meta-resources, e.g., provisioning servers (102, 104, 106, 108) is irrelevant to subscribing parties e.g., clients (112) and (114), as long as guarantees are made and met by implementing suitable resource management techniques. The invention is useful and suitable for the next generation of the Internet where due to virtual proximity, resources will be appear to be abundant by efficiently managing scattered resources from around a wide area network.

As resource management must deal with widely distributed and heterogeneous systems each with varying approaches to resource management, the techniques of the present invention leverages awareness of a common service model as a mechanism to address heterogeneity across servers. To this end, the invention facilitates configuration and management of resources in a server in a platform-independent manner. It is essential and desirable that the remote administration of the global meta-system, as provided by an remote authority (200), to be described in greater detail herein, be able to compare heterogeneous servers, e.g., servers (102) and (104) on the same basis when choosing between then. To this end, the present invention implements a service unit construct (150) with the capacities of a meta-resource (i.e., a server) being defined in terms of service units.

Figure 2:
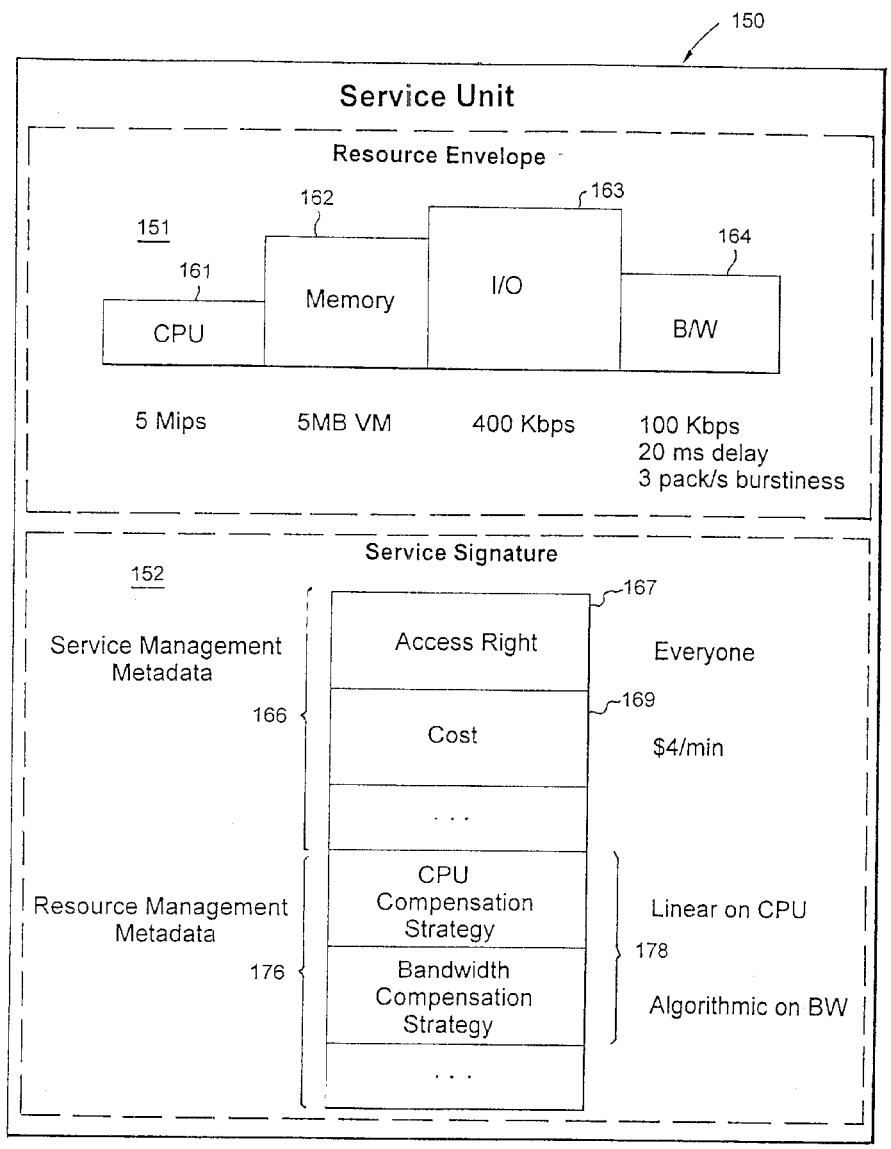
FIG. 2 illustrates the service units construct as comprising a service signature and a resource envelope.

Particularly, as illustrated in FIG. 2, the service unit (150) is represented in terms of an allocation vector (151) whose members represent resource allocations for memory (162), disk I/O (163), network bandwidth B/W (164), and CPU resources (161). As will be described in greater detail herein, the service unit allocation vector is referred to herein as a "resource envelope" as needed for provisioning of a media service. The resource envelope represents a bound set according to some criteria over critical-resource requirements associated with the provisioning of a media service. Further, the remote authority maintains a "service signature" or meta-data construct (152) relating to the characteristics of an associated resource envelope. In general, a service signature comprises service management metadata (166) as well as resource management metadata (176). It is an aspect of the present invention that such service signature be used to customize the integrated service-oriented management approach to resource management. In particular, a service signature describes information, hints, and recommendations about things such as access rights, privileges and characteristics of services that can use that particular service unit. For example, the service signature could be used to define access rights (167) and cost (169) characteristics for any particular service unit. The service signature is used as well to deliver hints to the meta-resource about resource management. For example, the service signature could be used to recommend run-time compensation strategies (178) to be used to update the resource envelope for a service unit provided for a given meta-resource type at possibly different loads. That is, as will be described in greater detail herein, the system of the invention provides means to compensate for differences between actual resource requirements found during the provisioning of a media service and the resource profile associated with a service unit. It is a possibility that the resource envelope projected by a service unit may incorrectly estimate the resource requirements needed to provision the service object. The service signature (150) is one of the ways in which the present invention allows the integration of service management with resource management.

According to the present invention, the remote authority (200) implements a mechanism for configuring heterogeneous meta-resources in terms of homogeneous service-oriented resource units, i.e., the service units. Particularly, the service unit is used to represent a resource allocation commitment from a participating server to be able to provision a particular media service on-demand. A different service unit is associated with each service and that the same service unit definition may result in different resource envelopes across different meta-resources supporting the same media service. Such resource envelope profiles may be time-variant or constant as described within, as will hereinafter be described in greater detail. It is an aspect of the present invention to generate and adapt such resource envelopes for any media service.

As will be described in greater detail herein, the present invention implements the construct of service bins as a mechanism to enable the co-allocation of resources in a meta-resource. Generation of a service bin is intended to provide a performance envelope over the overall resource requirements for provisioning of a service. It should be noted that the generation of a resource envelope may be done either at the meta-resource or by a remote party. Either way, techniques are known in the art for generating a performance envelope for various resources. For example, administrators may generate a bin specification by applying a test suite to an application over typical content to generate a resource envelope. The envelope is intended to define a long-term resource allocation that may be, for example, a worst case or a 70th percentile. If a worst case allocation is not used, then there are techniques to, on-demand, compensate for the difference on resource allocation requirements. In particular, in the invention, a shared overflow pool is used to allot such resources on-demand. A ranking of deviations may be used to further optimize the use of this overflow pool, as for example, to set aside such deviations ahead of time. A ranking of deviations may be produced to allow the compensation bin to set aside such deviations ahead of time.

In general, the generation of a resource envelope for a particular service is comprised of the following steps: first, an initial set of service objects is selected according to some criteria such as frequency of use or similarities; second, a resource profile is obtained for each critical resource associated with the provisioning of the service object; third, the resource profile is smoothed into K fixed duration intervals; fourth, for each interval, a resource requirements envelope is calculated. A skilled artisan will appreciate that there are known ways to generate such smoothed performance envelopes for stored continuous media. For example, for an internet TV model based on the streaming of stored MPEG content, there are known ways to retrieve the profile comprising of, at most, K segments; fifth, the extraction of meta-data relating to the characteristics of the envelope and its fit over the representative service objects. For example, an 80% percentile may be used to generate a 2nd-tier envelope where peaks about the 80% are identified on the metadata; finally, storing the resource envelope and meta-data into the service unit database.

Figures 3A, 3B:
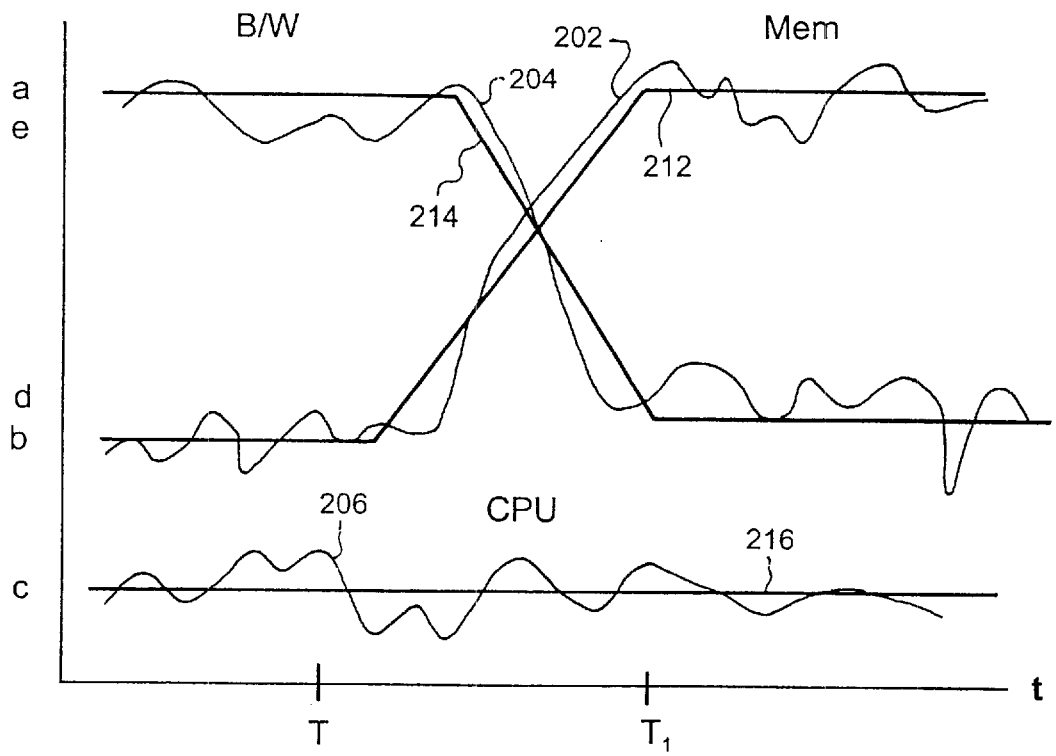
FIGS. 3(a) and 3(b) illustrates the concept of generating a resource envelope portion of a service unit.

FIGS. 3(*a*) and 3(*b*) particularly illustrate by way of example, the test generation of a time-variant resource envelope profile (151) (FIG. 3(*a*)) which is essentially a plot of the resource usage versus time for a given service, e.g. provision of streaming video. As shown in FIG. 3(*a*), one method determines variance 202 of a memory resource, which as shown in FIG. 3(*a*), increases from usage level "b" (e.g., 2 MBytes) at time T to a usage level "e" (e.g., 6 MBytes) at time T1. Likewise, as depicted by line 204, a B/W resource for the same service decreases from usage level "a" at time T to usage level "d" at time T1. The CPU performance variance is shown as being constant at level "c" over the time interval T to T1. The respective dark lines 212, 214 and 216 represent the average or static value for that resource over time, or, may be defined to represent a worst-case level. A corresponding table (152) of the time-variant resource envelope shown in FIG. 3(*a*) is depicted in FIG. 3(*b*).

It is understood that different meta-resources may have slightly different resource envelopes for the same service unit to suit their particular needs and requirements. Furthermore, a service unit database (not shown) enables caching, storage, and updating of resource envelopes for any particular service unit.

Referring back to FIG. 1, there is further illustrated the concept of a meta-resource, i.e., server, which is represented in terms of capabilities, which, for example, may represent a heterogeneous media unit streaming capacity. Each server, e.g., server 106, may be logically partitioned as comprising a storage bin (116), for maintaining persistent content e.g., a multi-media object, and storage bin (118) for maintaining service resources, e.g., for streaming multimedia content to a client. Each server additionally may be logically partitioned as comprising local storage and service capabilities (116*a*, 118*a*) and global storage and service capabilities (116*b*, 118*b*). For example, the server (116) of FIG. 1 illustrates local storage object S1 being bound with a local resource to provide, for example, digital video a streaming service. Each capability may be assigned to local or global management with a remote administrator (200) managing the global capabilities, for example, while local capabilities are managed by the administration of the meta-resource. It should be understood that the administration of the meta-resource allocates a ratio of global (e.g., 100–x %) and local (e.g., x %) capabilities.

Figure 4:
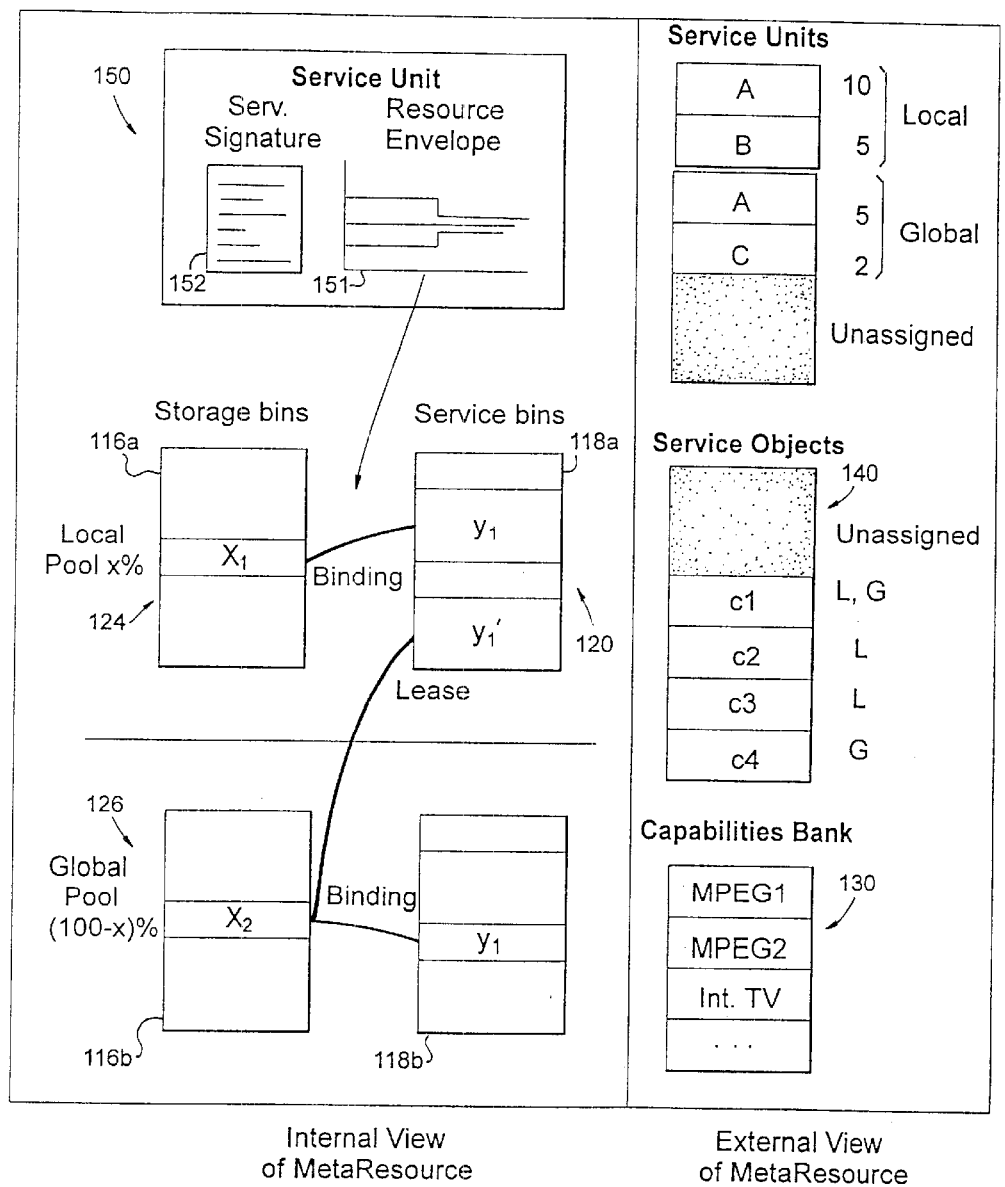
FIG. 4 depicts the relationships between service units, service bins, storage bins, global and local pools, resource envelopes, and service signatures within a meta-resource according to the invention.

As shown in FIGS. 1 and 4, the capacity of a meta-resource is measured in terms of service units (150) (including resource envelopes (151) and a service signature (152) comprising the metadata), a local pool (124) comprising storage bins (116*a*) and storage bins (118*a*), and a global pool (126) comprising storage bins (116*b*) and storage bins (118*b*). For each service unit, a service bin may be associated which has one slot (e.g., 120) for each different resource capability tuple, e.g., memory, CPU, B/W, etc.. In addition to capabilities, a meta-resource manages a storage bin which is used for each content. Each meta-resource is assigned content that is local and/or global. Global content may be obtained in accordance with the techniques described in related commonly-owned, co-pending U.S. patent application Ser. No. 09/335,272, filed Jun. 17, 1999, entitled SYSTEM AND METHOD FOR INTEGRATED LOAD DISTRIBUTION AND RESOURCE MANAGEMENT ON INTERNET ENVIRONMENT, the whole contents and disclosure of which is incorporated by reference as if fully set forth herein. Replicated content is globally maintained. Local content is referred to as original content. A streaming connection is formed by binding a storage bin to a service bin, the binding being evaluated at a quality of service. The service bin is associated with resource requirements needed to stream content in such resolution. Each content is associated with a resource profile (151) which is used to facilitate the evaluation of the binding.

The resource management system of the invention opens such Internet media utilities model to arbitrary media servers. In particular, the system of the invention enables an arbitrary media server to participate and offer a position of value to an open and deregulated Internet utilities environment. To this end, the invention intends to remove heterogeneity in resource management across heterogeneous servers via the use of service units.

The administration of such resource management may be delegated to an intermediary. In particular, a mechanism is provided that allows the resources provided by media servers scattered throughout the network to suit the characteristics and needs of, or parts of, the subscriber mass. Thus, in accordance with the capacity shaping mechanism described in commonly-owned, co-pending U.S. patent application Ser. No. 09/335,273, filed Jun. 17, 1999, entitled SYSTEM AND METHOD FOR CAPACITY SHAPING IN AN INTERNET ENVIRONMENT, the whole contents and disclosure of which is incorporated by reference as if fully set forth herein, the invention enables a remote authority to drive the administration of service units across servers based on some criteria such as, for example, the collective needs of such servers as opposed to the needs of a particular server. In accordance with the disclosure provided in commonly-owned, co-pending U.S. patent application Ser. No. 09/335, 261, filed Jun. 17, 1999, entitled SELF-REGULATED RESOURCE MANAGEMENT OF DISTRIBUTED COMPUTER RESOURCES, the whole contents and disclosure of which is incorporated by reference as if fully set forth herein, the remote authority may comprise a Service Control Plane (SCP) which functions as an intermediary control device between clients and servers in a distributed computer network.

As it is desirable for a meta-resource to be useful to the remote authority, the meta-resource is: (1) autonomous, (2) trusted, (3) configurable, and (4) able to offer a position of value to the remote administration. The meta-resource is to remain autonomous because, otherwise surrendering a meta-resource to the control of a remote authority would deter the proliferation of meta-resources. The invention delivers this autonomy through three notions: service units, service signatures, and independent global vs. local resource management. A skilled artisan will thus appreciate the difference between a service commitment and a resource reservation and its role on extending autonomy over meta-resources.

Similarly, a skilled artisan will appreciate that the meta-resource needs to be trusted by the remote authority and vice-versa. Security when accessing a meta-resource is important to the content subscriber. A mechanism is needed to enforce trust between the different parties. According to today's best practices, a key-exchange mechanism such as RSA may be used to handshake with a resource provider and authenticate the resource provider. Such mechanism is applicable to any other party. Security about the content being accessed is additionally important to the content provider. Thus, enforcement of copyrights and other forms of intellectual property protection over content is necessary. A skilled artisan will appreciate that this is a recognized need and means may be deployed to facilitate the enforcement of copyright between parties having different levels of trustiness. In particular, digital watermarking techniques may be used for safeguarding the copyrights of service objects.

In is intended that for the meta-resource to offer a position of value to the remote administration authority (200) (FIG. 1), e.g., SCP, the meta-resource must react to the SCP but retain autonomous control of its resources. To this end, the invention enables the configuration of a meta-resource in terms of service units (i.e., service-oriented promises or commitments) to the SCP while the fulfillment of these commitments is left to the meta-resource. As previously mentioned in conjunction with FIG. 1, meta-resources may be locally administered, each meta-resource is partitioned into two virtual media servers: a local virtual media server holding persistent content to provide services for that content provider; and, a global virtual media server, that the SCP manages, on to which content may be replicated to provide services to meet the wider needs of the framework. To this end, in the preferred embodiment, the meta-resource is partitioned into two different and independent resource pools having separate administration. On one hand, a local resource pool is implemented by the meta-resource to provide media services to be allocated by the local meta-resource administration. On the other hand, a global resource pool is implemented by the meta-resource to provide media services to be allocated by the remote administration authority.

Figure 5:
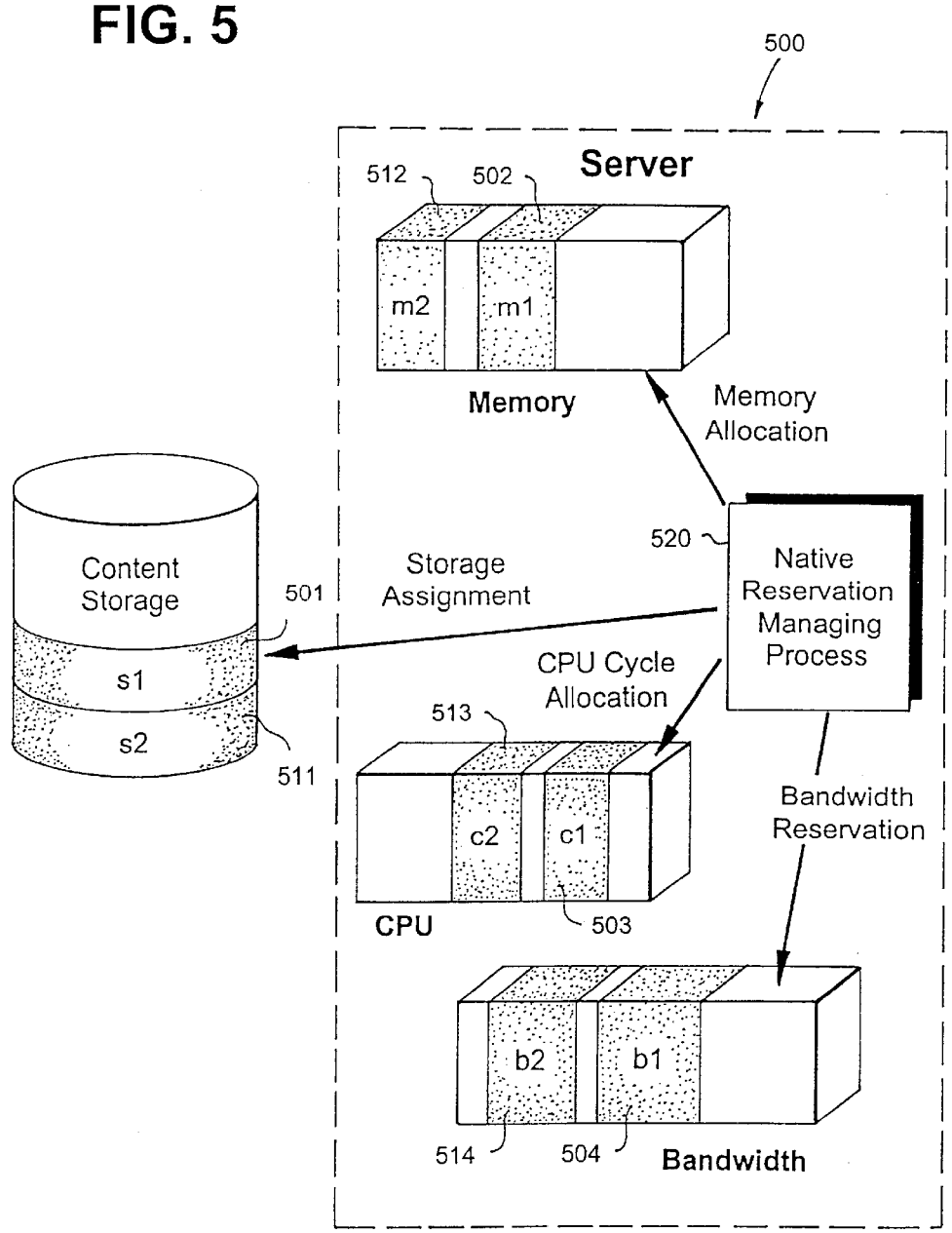
FIG. 5 depicts the allocation of individual resources on a meta-resource and its relationship to service and storage bins according to the invention.

FIG. 5 illustrates streaming of MPEG-1 content, e.g., consuming resources s1 (501), m1 (502), c1 (503) and b1 (504). Streaming of another type of content, e.g., one coded in MPEG-2, may require s2 (511), m2 (512), c2 (513) and b2 (514) resources. Thus, as a convenient means of measurement of the consumption of resources by a various classes of applications, resources are characterized as storage s and service r(m,c,b) bins. Consequently, the resource is viewed as a set of storage and service bins, which represent capabilities for provisioning services. As not all applications are identical, it is necessary to obtain a worst resource bound for content, requiring experimental measurement of different classes of applications for various servers. However, this approach allows convenient normalization and reservation of heterogeneous server resources by various classes of applications.

As mentioned, a system administrator configures overall resources as local and global. The administrator is responsible for establishing the ratio of local to global resources for each server as well as to establishing policies relating to load limits for those resources. After configuring a partition as global storage, the global resource management takes over the control of this resource. Thus, a global storage bin represents a partition that can only be reserved by the global resource management provided by SCP. Note, that the system administrator or the server (500) itself, depending on a relevant policy, may re-claim the global resource in full or partially, by requesting its release from the SCP management. A native reservation management process (520) as shown in FIG. 5, is responsible for monitoring resource consumption, and determining the server willingness to accept new requests. It is understood that, the native process may discriminate between application requests for global and local content. Additionally, a request for placement of a global replica may be declined or accepted, as controlled by internal meta-resource policies governing the autonomy of the meta-resource with respect to admission control for example, one such policy could attempt to maximize the revenue associated with global resources and thus reject replicas expected to have high cost or little revenue. Such a policy may also depend on request statistics monitored by the SCP.

Figure 6:
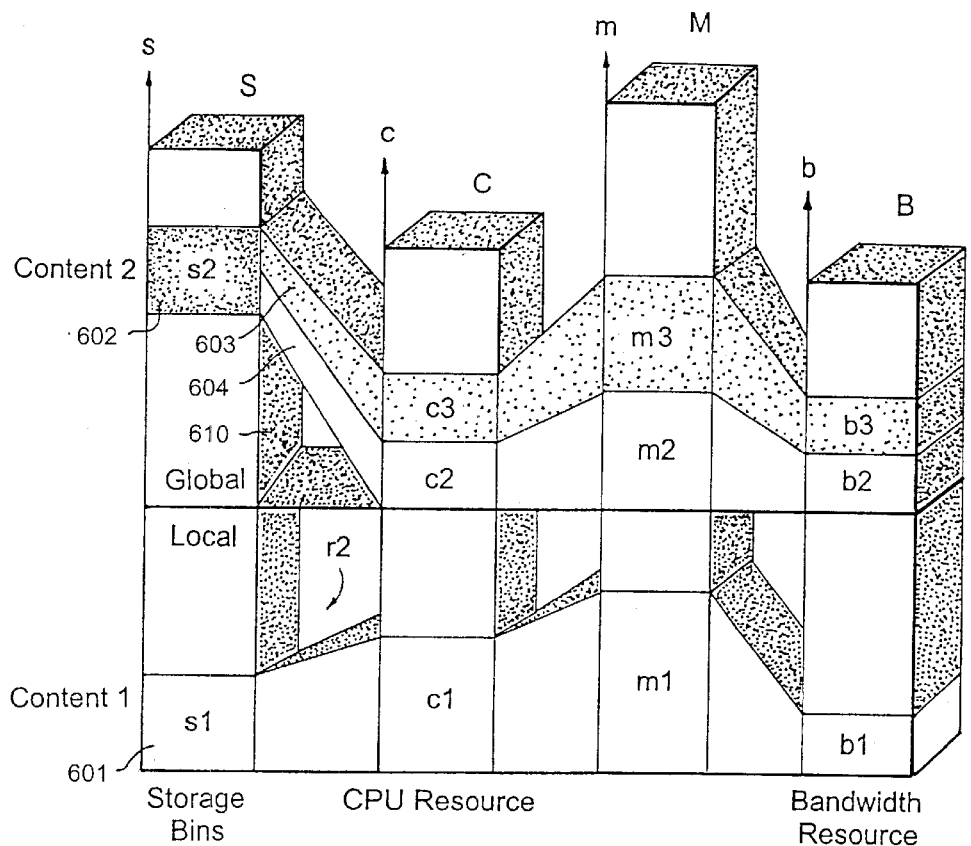
FIG. 6 illustrates via an example the use of service and storage bins and the use of global and local bins in a meta-resource as prescribed in the present invention.

FIG. 6 illustrates an example scenario where a system administrator has configured all server resources onto two partitions, one local and one global. As shown in the example scenario depicted in FIG. 6, two streaming applications share a transient content replica and consume one global storage bin s2 (602) and two service bins r2 (603) and r3 (604), while one application consumes a persistent content replica included in service storage bin s1 (601). Overall global storage resource consumed is thus equivalent to s2, while an overall global service resource is a sum of bins r2 and r3.

Referring back to FIG. 4, there is illustrated an example use of service and storage bins and the use of global and local bins in a meta-resource as prescribed according to the present invention. As previously mentioned, a service unit represents a service-oriented resource commitment by a meta-resource to provision a corresponding media service. Similarly, a service unit may be committed to be global or local, or both. On one hand, a local service unit is used to denote a commitment for a unit of service by a particular meta-resource where such meta-resource is to determine the binding of resources (associated with a service unit) to some service object (to be provisioned via those resources). On the other hand, a global service unit is used to denote a commitment of a unit of service by a particular meta-resource where the binding of such resources to some service object is to be determined at a later time by an external party to the meta-resource. The meta-resource may comprise a list (140) of service objects c1, . . . , c4 with a mapping as being locally available (L), globally available (G), or both (L,G).

Figure 7:
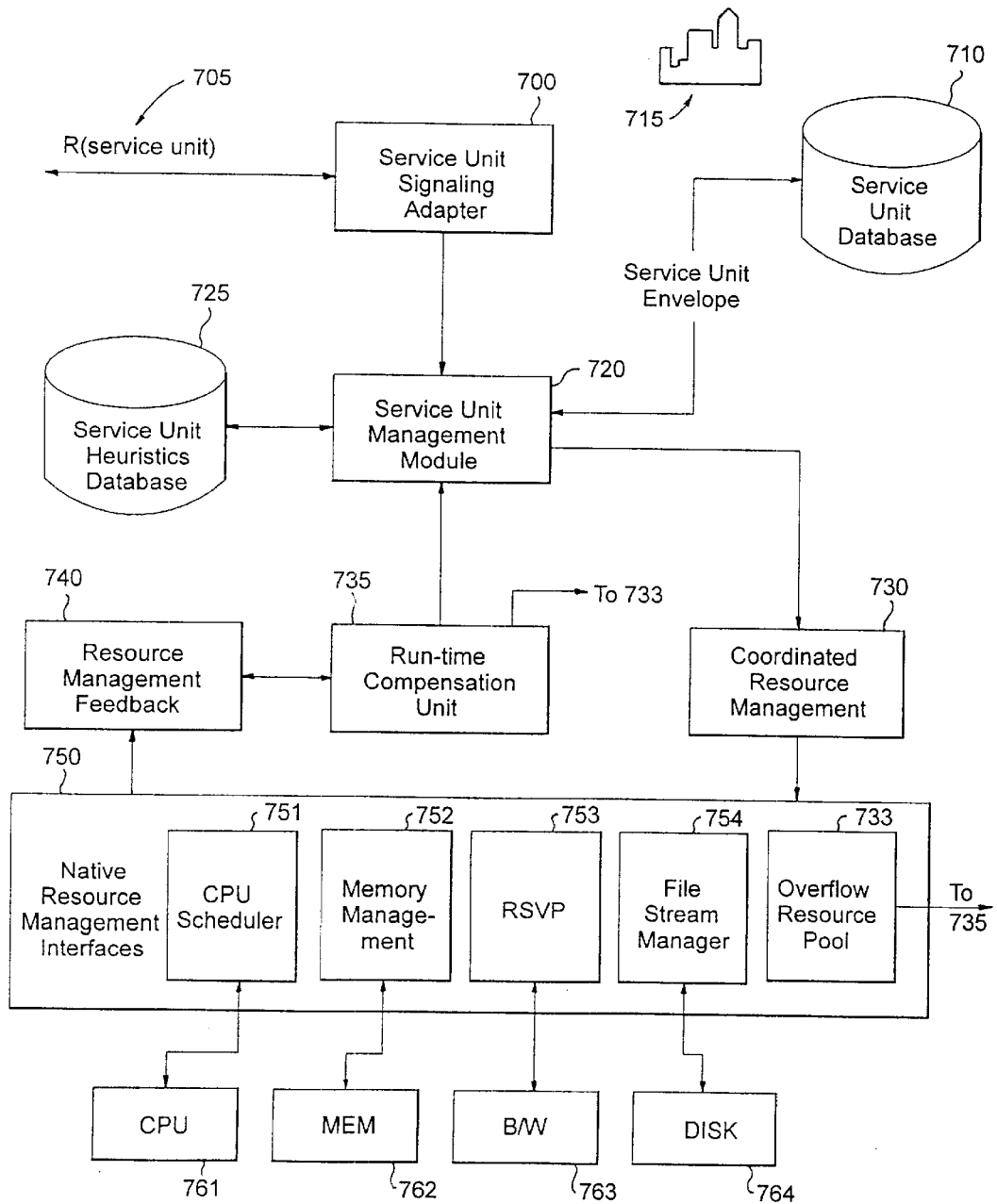
FIG. 7 is an illustration depicting the component architecture of the service unit resource management module at a meta-resource as prescribed in the present invention.

For each type of service (i.e., capability) being provided by a meta-resource as indicated in a capabilities bank (130), a number of service units is pre-allocated. Thus, as shown in FIG. 4, ten (10) service units "A" may be committed to a local pool, while five (5) service units "A" may be committed to the local pool. Preferably, the pre-allocation is done independently for both the global and local pools. The administration of the meta-resource defines this number (herein referred to as the capacity of a capability) according to some criteria such as expected revenue or availability. For example, a meta-resource could be made to be from 0% to a 100% global (i.e., shareable with the global meta-system), as determined by the meta-resource administration. It should be noted that resources associated with fractional service units in a meta-resource might be allocated into a third pool referred to as an overflow pool (not shown). That is, after allocating both global and local service bins according to requirements or needs for provisioning services, there may be resources leftover. These remainder resources are managed as a overflow pool (733) as shown in FIG. 7. The overflow pool thus contains resources that are not being reserved for provisioning any service bins and thus, are free to be allocated by the meta-resource (server) as deemed necessary. For example, the overflow pool may be used to provide the resources needed to provide run-time resource compensation.

It is an aspect of the present invention that all these three different pools are independently administered. The invention enables administration of these resource pools in terms of the type and number of service units. The administrator of a meta-resource is thus able to enhance the value such meta-resource offers to the remote authority by reconfiguring these resource pools to suit demand. Such administration may be based on some criteria such as the expected revenue, or some other cost metric. It is a further aspect of the present invention that individual meta-resources be entitled to various degrees of greediness toward acquisition of service requests by configuring their resource pools and capabilities to suit demand and revenue expectations. Moreover, it is an aspect of the present invention that such administration of the meta-resource may be done remotely. In particular, the ratios of capacities between global, local, and overflow may be set dynamically based on the needs of a remote authority, for example.

Media services on a meta-resource are modeled in terms of capabilities. Herein, a capability is used to refer to a media flow processing function which, for example, takes a stream f as input, applies a transform over the stream, and outputs a stream f'. Examples of such functions include, but are not limited to: media filters, encoders, decoders, transcoders, multiplexers, de-multiplexers, frame counters, object detectors, flow encryption, content-based filtering, content translation, etc. It is understood that such capabilities may be downloaded into meta-resources. A meta-resource however, may offer a desirable tradeoff in some resource management characteristics (e.g., the desired bandwidth at the desired geographical location) but may be lacking the necessary service management characteristics (e.g., the presence of a desired capability). Thus, according to the invention, a meta-resource may request and download some of its capabilities from a remote capabilities bank.

To this end, a mechanism is provided to download a capability to a service insertion point meta-resource. An authority (e.g., the remote administration authority) may be used to determine the proper placement of capabilities through the collection of distributed meta-resources and where such placement could be based on some set criteria such as a cost benefit analysis with respect to bandwidth, geography, or utilization, for example. Alternately, or in addition, the placement of a capability may be auctioned as opposed to having the placement of such capability assigned by some remote administration. Last, a mechanism is provided to permit a meta-resource to receive recommendations about configuration and management of its resources and capabilities such, as for example, to suit the needs of the remote administration.

Via access controls over capabilities and service units, the resource provider is now enabled to grant or deny access to the download of capabilities as well as the administration and configuration of its resources into service units.

FIG. 7 depicts the components of service unit resource management at a meta-resource. A service unit signaling adapter (700) enables the meta-resource to receive provisioning requests (705) in terms of service units. The signaling adapter (700) allows the meta-resource to communicate to external parties in terms of service units, provisioning requests, service signatures, and resource envelopes. The service unit management adapter (700) enables a remote intermediary controller to interface with resource management in this meta-resource. A service unit database (710) provides the service unit management module (SUMM) (720) with the resource envelope associated with a particular service unit. The service unit management module (720) coordinates the translation of service units to individual resource requirements and interfaces with the service unit mapper (730) to place coordinated requests as well as updates for resource allocation across one or more resources. Specifically, the coordinated services to resource mapping (730) receives a service bin specification and generates individual resource allocations based on the compensated service unit's resource envelope. Operating system interfaces provide access to individual resources such as CPU (761), memory (762), network bandwidth (763), disk bandwidth and disk storage (764). The service unit mapper module (730) additionally provides interfaces to the individual resource management interfaces. A run-time compensation module (735) computes the necessary adjustments over the resource envelope. The service unit management module (720) allows the control of resources in terms of application level units as opposed to individual resource requirements. Resources are thus allocated in terms of application requirements and optimized to local and global cost metrics as opposed to rigid resource utilization. The SUMM enables implementation of run-time adjustments to be made to the service unit envelope as well as run-time adjustments to the service unit weighting function.

It should be understood that, in addition to servicing requests, the remote authority could push (i.e., update) the definition of a particular service unit (i.e., envelopes and signatures) to a meta-resource. Clearly this is needed when a new service is being introduced, as otherwise each service unit would need to be loaded manually at each server. If a resource envelope is pushed into a meta-resource, the meta-resource updates its service unit database (710) with the new resource envelope. A skilled artisan will appreciate that such operation is desirable when new service objects are introduced and resource envelopes have been recommended by the creator of the service object. If a provisioning request is dispatched to a meta-resource, the service unit management module (SUMM) determines whether the provisioning request can be scheduled by the meta-resource given the available resources. If a service signature is pushed into the meta-resource, the SUMM updates the corresponding service signature during the handling of future updates. If a reservation for a number of service units is requested to the meta-resource, the SUMM determines whether the reservation can be scheduled given the projected resources.

With further regard to compensation, as the possibility may exist that a resource envelope projected by a service unit may incorrectly estimate the resource requirements needed to provision the service object, existing interfaces are provided by the server operating system to permit monitoring of resource reservation exceptions. The resource management feedback unit (740) receives these exceptions and forwards these to the run-time compensation unit (735), which in turn computes the departure on the resulting resource envelope utilizing heuristics provided in a service unit heuristics database. Specifically, the resource management feedback module (740) is a software handler that maintains an association of individual resource monitors to a service unit and triggers a compensation of the resource envelope for a service unit during run-time. Once a service unit is allocated, individual resource monitors are started and associated with a common service unit. In case of an allocation exception or predicted under/over usage condition (against that predicted by the service unit's resource envelope) an exception may be fired by any one or more of these individual resource monitors. For example, if bandwidth is predicted to be low, the network I/O monitor (not shown) will signal such condition to the resource management feedback module which determines whether additional bandwidth needs to be allocated. To make such decision, the resource management feedback module (740) may rely on heuristics or policies. The service unit heuristics database (725) includes rules about how to operate over service unit as first class objects. For example, it knows/learns that for certain service units, allocating two of them at the same time really means allocating 2× the resources whereas for others it means a worst case bound of, say, 1.4× the resources. This database additionally comprises data known to artisans in adaptive resource management such as bounds over resource adjustments, periodicity of resource adjustments, relative priorities of resource adjustments, etc.

If a compensation is deemed necessary, a signal is sent to the run-time resource compensation unit (735) which may apply to one or more resources. Particularly, the run-time resource compensation unit operates on stimuli from the feedback module and knowledge from the heuristics database. The run-time compensation unit implements the adjustments or compensations and determines the order of adjustments. It also plans to prevent deadlocks and manages the overflow pool (733) which interfaces with the compensation unit to support run-time compensations. If the departure requires compensation, the compensation recommendation is forwarded to the SUMM, which first places a request for a resource envelope update from the coordinated resource management unit (730) and then determines whether the corresponding envelope needs to be updated in the service unit database to avoid similar problems in the future. A skilled artisan will appreciate that it may not always be advantageous to update the service unit database as load anomalies may require anomalous resource allocations, which may significantly exceed the requirements of average provisioning requests.

Figures 8A, 8B:
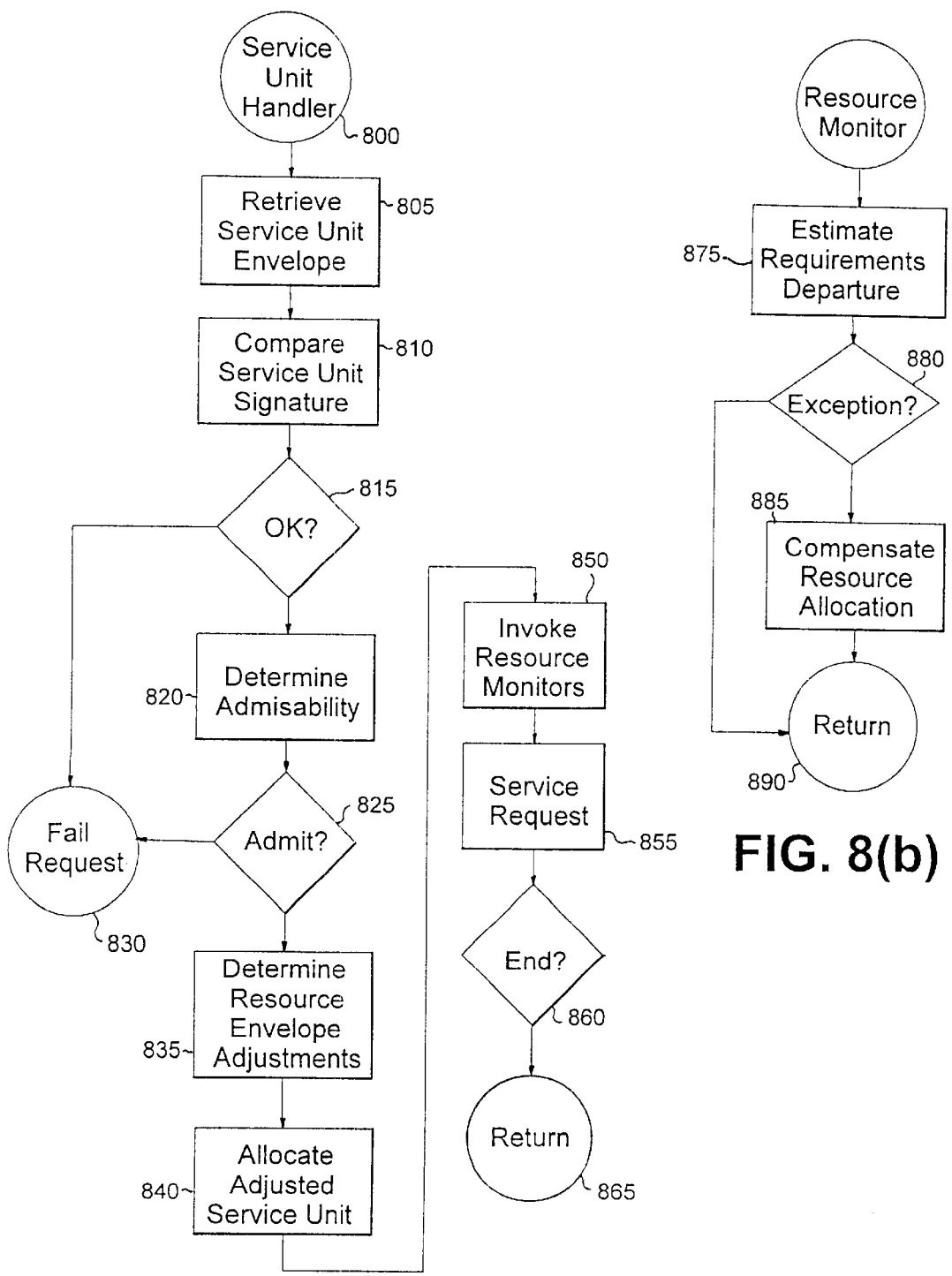
FIGS. 8(a) and 8(b) are flow charts depicting the method for handling a service request by the service unit resource management module.

FIG. 8(a) is a flow chart depicting in greater detail the process for handling a provisioning request (800). As shown in FIG. 8(a), the signaling adapter receives the provisioning request and then forwards any such request to the SUMM which then interfaces to the service unit database in order to retrieve and update resource envelopes (805). At step (810), the service unit signature for the particular requested service is compared with resources at a particular server. Specifically, when a request arrives at the meta-resource, it is necessary to determine whether the request can be serviced, i.e., if the meta-resource is capable, has the resources, is willing to, and has the necessary capability. All these decisions are abstracted by the service unit. Therefore, a determination is made at step (815) as to whether a service unit in a meta-resource is present indicating that the server is capable of provisioning such unit, i.e., that the necessary resources are present. The presence of a service unit provides the ability to determine the willingness of the server in accepting a request. If the service unit is not present, the request fails and the process ends without fulfillment of the request. If the service unit is present, then at step (820) a determination is made as to whether the meta-resource is willing to accept the request, i.e., if the server is willing to provide the media service when criteria such as price, current service unit utilization, and access controls, for example, are considered. Specifically, after a request arrives to the meta-resource, the meta-resource must decide whether to service the request or not. Such decision is supported by the meta-data in the resource. For example, the meta-resource (i.e., the server) determines whether the requests is associated with the right access controls (permissions) to use the service/storage bins being requested. Other criteria are price/cost admissibility. For example, the request may bound cost to $4.00 for example, whereas the meta-resource is willing to provide the service at $3.00. At step (825) the process will terminate if the request is not admissible, or, will continue otherwise. At step (835) any resource envelope adjustments are made and, at step (840), the adjusted service unit is allocated. For example, a service request may request a service unit (X, Y, Z) resource units of respective resources and is currently being serviced. A second request requests (X, Y, Z). For the adjustment step (835), a heuristics database look-up is performed and a determination made as to the form of the resulting resource allocation (f(X), g(Y), h(Z)) given the class of server (meta-resource). Once the resources are determined, any extra resources can be transferred to the overflow pool (e.g., for the duration associated for the provisioning of this request). This is accomplished during step (840) as well. Then, at step (850) the resource monitors are invoked by the operating system of the provisioning meta-resource (server) to monitor actual resources utilized in the provisioning of the requested service which is provided to the client as indicated at step (855). After provisioning of the service, the process ends at step (860) and returns to process more requests at step (865). Typically, the SUMM (FIG. 7) renders all its comparisons and determinations based on the corresponding resource envelope associated with a particular request and then requests the coordination and allocation of the service unit. However, the coordination between the various resources associated with a particular service unit is provided by the coordinated resource management module (730). In turn, the coordinated resource management module interfaces with the resource management interfaces (750) provided by the operating system found on the meta-resource.

FIG. 8(b) is a flow chart depicting in greater detail the real-time resource monitor process thread invoked at step (850) of FIG. 8(a). Typically, this functionality is standard in most computer operating systems. For example, resources that may be monitored include virtual memory and page hits, stream I/O and buffer management, CPU and CPU load scheduling and priority handling, etc (See FIG. 7). As shown in FIG. 8(b), at step (875) the requirements departure is estimated, e.g., the number of I/O buffers needed to stream (e.g., 1 MB) and bandwidth. Techniques such as optimal smoothing of recorded and live video allow estimating reliably these values and determining under/over flow conditions. As it may be the case that the resource monitor (750) may not react on the first trigger, the monitored input data may be smoothed due to the nature of conventional operating systems. For example, an exponential smoother may be used. Trend assessment may additionally be performed as well. A critical threshold (that would be stored in the heuristics database) associated with each particular resource may be used to determine whether any departure is statistically significant, thus resulting in the generation of an exception (step 880). For example, correcting a 0.0001 departure is not a significant departure. Then, at step (880), a determination is made as to whether an exception has been detected. If an exception has not been detected, then the process returns at step (890). If an exception has been detected, then the resource allocation is compensated, as indicated at step (885) in the manner as described herein. Otherwise, the process returns at step (890).

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for administering resources in heterogeneous server devices included in a distributed wide area computer network, said resources including media content and service resources for providing said media content to clients, said system comprising:

a) for each of said server devices, a first resource pool comprising resources for providing media services and capable of being locally administered; and a second resource pool comprising resources for providing media services, and capable of being remotely administered; each of said media services having an associated homogeneous service unit comprising a resource envelop representing a commitment of resources for provisioning a media service by a particular server device, and a metadata construct providing information for characterizing types of services that may make use of the service unit and for customizing said commitment of resources when provisioning a media service; and b) an administrator device for receiving client requests and determining a server device to provide a requested service, said administrator device accessing said homogeneous service units and comparing said homogeneous service units of associated server devices according to a predetermined criteria provided in an associated metadata construct to determine said server device, whereby said homogeneous server units provide a basis for integrating management of services and resources of heterogeneous server devices in said distributed wide area network.

2. The system as claimed in claim 1, wherein each service unit associated with a media service projects an envelope of resource requirements as needed for provisioning a media service.

3. The system as claimed in claim 2, wherein each service unit associated with a media service includes an associated service signature comprising metadata for enabling access to a service unit, each said server device including means for enforcing said service signatures.

4. The system as claimed in claim 3, wherein a service signature includes metadata representing rights, privileges and characteristics of services that may use a particular service unit.

5. The system as claimed in claim 3, wherein said server device further comprises:
   a) means for monitoring resource utilization when provisioning a media service; and
   b) means for compensating for differences between true resource utilization when providing a media service and its resource envelope as projected in its associated service unit.

6. The system as claimed in claim 5, wherein said service signature further includes one or more run-time compensation strategies for updating a projected resource envelope associated with a service unit at different network loads.

7. The system as claimed in claim 1, wherein a projected resource envelope includes data indicating one or more resource allocations selected from the group comprising: memory usage; disk storage; disk bandwidth; CPU resources; and network bandwidth.

8. The system as claimed in claim 7, wherein one or more said resource allocations includes a time-variant profile.

9. The system as claimed in claim 1, wherein said predetermined criteria includes a cost metric.

10. The system as claimed in claim 1, whereby allocation of resources in said first and second resource pools is determined by a local administrator for said server device.

11. The system as claimed in claim 10, wherein each of said first and second resource pools comprises one or more service bins allocated according to service units and one or more storage bins allocated according to media content objects.

12. The system as claimed in claim 10, further including a capabilities bank for downloading capabilities to said server device for configuring said service and storage bins thereof according to a determined administration.

13. The system as claimed in claim 10, further including means for generating a streaming connection comprising a media service, said generating means including binding a storage bin to a service bin, the binding being evaluated at a quality of service.

14. The system as claimed in claim 13, wherein a storage bin may be bound to a service bin from a same or different resource pool.

15. A method for administering resources included in heterogeneous server devices comprising a distributed wide area computer network, said server devices including media content and service resources for providing said media content to clients, said method comprising:

a) receiving a request for provisioning a media service to a client;
   b) accessing homogeneous service units associated with the requested service, each of said homogeneous service units comprising a resource envelop representing a commitment of resources for provisioning a requested media service to said client from a particular server device, and a metadata construct providing information for characterizing types of services that may make use of the service unit and for customizing said commitment of resources when provisioning a media service; and
   c) determining a server device having resources capable of provisioning said requested media service according to requirements specified in its associated service unit and said metadata construct, whereby homogeneous service units provide basis for integrating management of services and resources of said heterogeneous server devices in said distributed wide area network.

16. The method as claimed in claim 15, wherein said determining step c) includes comparing different service units associated with a requested service according to a predetermined cost metric.

17. The method as claimed in claim 15, wherein said method further including step d) of allocating resources at a server device according to a service unit in order to provision a media service.

18. The method as claimed in claim 17, wherein each service unit associated with a media service includes an associated service signature comprising metadata used to enable access to a service unit, said accessing step b) further including the step of enforcing said service signatures at a media server device.

19. The method as claimed in claim 17, further including the steps of:
   e) monitoring true resource utilization at a server device when providing said media service; and
   f) real-time compensating for differences between true resource utilization when providing said media service and its resource envelope as projected in its associated service unit.

20. The method as claimed in claim 19, wherein resources are allocated at a server device from a first resource pool, said method including transferring remaining resources not being used for provisioning a service in a second pool of resources.

21. The method as claimed in claim 20, wherein said compensating step f) includes allocating resources from said second pool of resources for supporting real-time compensations.

22. The method as claimed in claim 20, wherein said first resource pool comprises one-or more service bins allocated according to service units and one or more storage bins allocated according to media content objects.

23. The method as claimed in claim 22, further including the step of downloading capabilities from a remote capabilities bank to said server device for configuring said service and storage bins thereof according to a determined administration.

24. The method as claimed in claim 23, wherein said step of provisioning said media service further includes generating a streaming connection between a server device and a client by binding a storage bin to a service bin, the binding being evaluated at a quality of service.

* * * * *